(12) United States Patent
Schumann

(10) Patent No.: US 6,543,598 B1
(45) Date of Patent: Apr. 8, 2003

(54) CONTINUOUSLY VARIABLE MANUAL DRIVE

(75) Inventor: Peter Schumann, Untersiemau (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 0 days.

(21) Appl. No.: 09/720,945

(22) PCT Filed: Jun. 23, 1999

(86) PCT No.: PCT/DE99/01857

§ 371 (c)(1),
(2), (4) Date: Mar. 30, 2001

(87) PCT Pub. No.: WO00/01553

PCT Pub. Date: Jan. 13, 2000

(30) Foreign Application Priority Data

Jul. 1, 1998 (DE) .......................... 198 31 205

(51) Int. Cl.⁷ .............................. B60N 2/08; B60N 2/44
(52) U.S. Cl. .......................................... 192/223; 192/15
(58) Field of Search ..................... 192/223, 15, 19, 192/17 R; 297/344.11, 344.1; 74/535; 248/429

(56) References Cited

U.S. PATENT DOCUMENTS

| 4,094,489 A | | 6/1978 | Yoshimura ................... 248/429 |
| 4,143,905 A | * | 3/1979 | Hensel et al. ............. 297/361.1 |
| 4,408,799 A | * | 10/1983 | Bowman ...................... 16/242 |
| 4,778,138 A | * | 10/1988 | Yamada ...................... 248/421 |
| 4,926,987 A | * | 5/1990 | Honma ..................... 192/223.4 |
| 5,109,963 A | * | 5/1992 | Husted et al. .......... 297/344.12 |
| 5,794,479 A | * | 8/1998 | Schwarzbich ............. 192/223.2 |
| 5,865,285 A | | 2/1999 | Minkenberg et al. ......... 192/15 |
| 5,881,854 A | * | 3/1999 | Rougnon-Glasson ........ 192/15 |
| 5,908,101 A | * | 6/1999 | Watanabe ..................... 192/15 |
| 5,918,714 A | * | 7/1999 | Kadereit ...................... 192/15 |
| 6,120,098 A | * | 9/2000 | Magyar et al. ......... 297/344.11 |

FOREIGN PATENT DOCUMENTS

| DE | 26 53 890 | 6/1977 |
| DE | 33 46 754 | 7/1985 |
| DE | 34 38 335 | 4/1986 |
| DE | 36 08 858 | 10/1987 |
| DE | 41 20 617 | 12/1992 |
| DE | 195 27 912 | 8/1996 |
| DE | 195 46 433 | 5/1997 |
| DE | 195 47 513 | 6/1997 |
| DE | 196 25 591 | 1/1998 |
| EP | 0 549 082 | 6/1993 |
| EP | 0 631 901 | 1/1995 |
| WO | WO 98/25791 | 6/1998 |

\* cited by examiner

Primary Examiner—Rodney H. Bonck
(74) Attorney, Agent, or Firm—Christie, Parker & Hale, LLP

(57) ABSTRACT

The invention relates to continuously variable manual drives for seat adjusters in motor vehicles. In a first design of the invention the drive has a transmission step which is coupled on the drive side or output side to the drive. A second design of the invention provides a continuously variable manual drive for seat adjusters in motor vehicles in which the drive and the output-side gear elements are connected together through a switchable coupling device, which in the non-actuated state maintains the power flow between the drive and the output-side gear elements by means of spring pretension and in the actuated state breaks off the connection between the drive and the output-side gear elements so that a passive seat adjustment is possible.

40 Claims, 13 Drawing Sheets

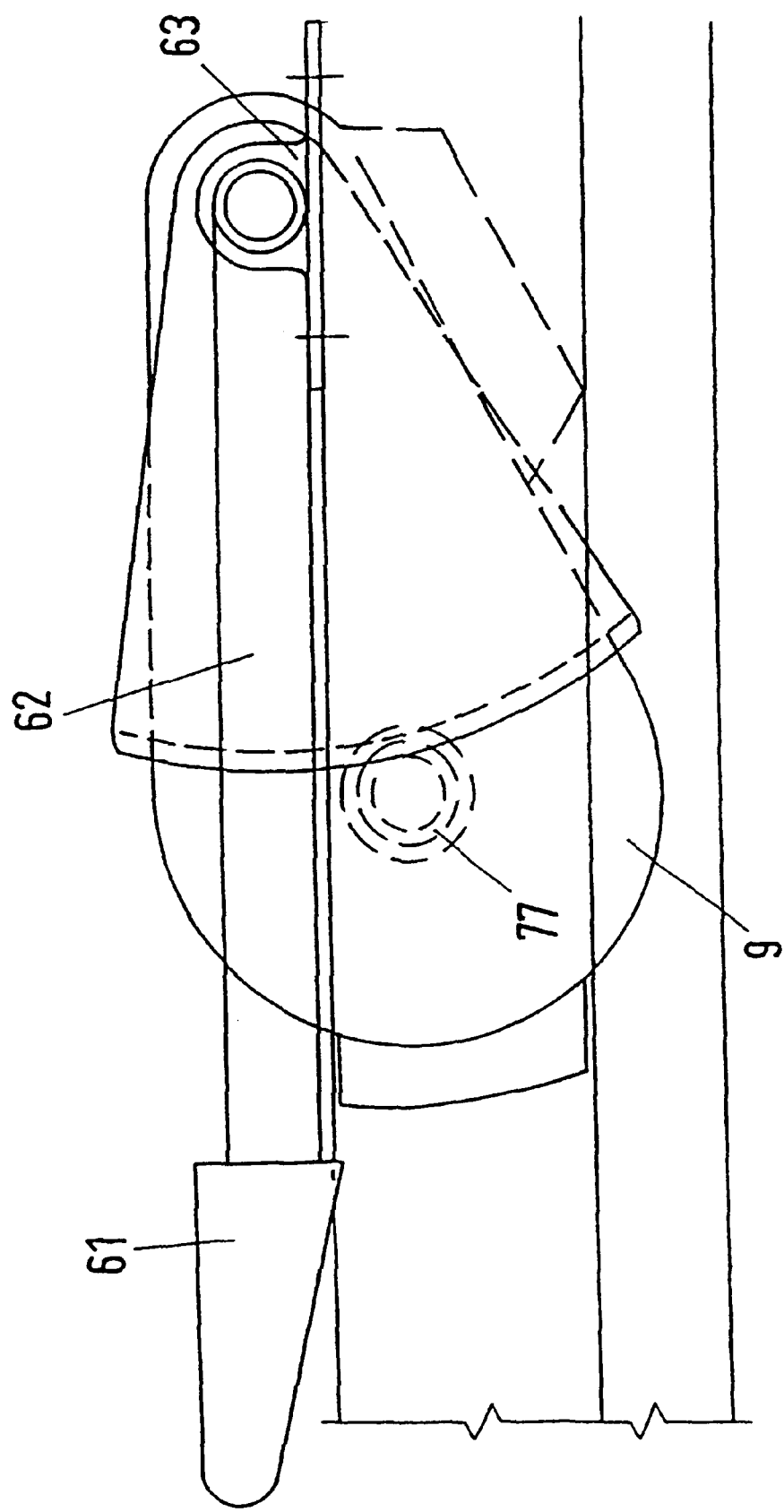

CONTINUOUSLY VARIABLE MANUAL DRIVE

CROSS REFERENCE TO RELATED APPLICATION

This application claims priority of International Application No. PCT/DE99/01857, filed Jun. 23, 1999, which in turn claims priority to German patent Application No. 19831205.9, filed on Jul. 1, 1998.

FIELD OF THE INVENTION

The invention relates to continuously variable manual drives for seat adjusters and the use of such drives for longitudinal seat adjusters in motor vehicles.

BACKGROUND OF THE INVENTION

A drive is known from EP 0 549 082 A1 which describes a continuously variable linear drive for a rail guide system for motor vehicle seats having two rails connected together and displaceable longitudinally relative to each other. The rails include, between them, a hollow cavity in which an adjusting element is mounted which is connected to one of the rails. The adjusting element engages teeth connected to or provided on the other rail and running in the longitudinal direction of the rail. With the known linear drive, the drive action is motorized for which a drive motor and a corresponding control and power supply are required.

Another drive is known from WO 98/25791 A1 in which seat adjustment is carried out by using a step switch mechanism which transfers a drive force to a gear element on the output side. A locking device is mounted in the power flow between the step switch mechanism and the output-side gear element to block torque transfer on the output side and enable torque transfer however on the drive side. In addition, in one embodiment there is a transmission between the drive and output sides of the step switch mechanism through which the drive force or adjusting path can be adjusted.

A manual drive operating on both sides, for seat adjusters in motor vehicles using a step-switch mechanism, is furthermore known from DE 195 27 912 A1 in which a drive lever is mounted on a drive axis and supports swivel locking elements whose free ends, which are provided with toothed elements, can be brought into engagement with teeth provided on the circumference of a drive wheel for the purpose of transferring force.

From DE 41 20 617 C2 a connection is known between a drive and an output having a locking coupling in which torque on the drive side is transferred in both directions of rotation to an output element while torque on the output side is blocked in both rotary directions by the locking coupling and is consequently not transferred to the drive element.

The known step switch mechanisms are used in particular in the motor vehicle field for devices for adjusting the height or incline of a seat. For this purpose they are set up to transfer a large force over a short path to an adjusting gear, such as is required in particular for moving a seat upwards on which the user of the vehicle seat is actually located.

SUMMARY

The invention is concerned with the problem of providing a drive for longitudinal seat adjusters which enables a continuously variable adjustment of a vehicle seat, thereby always ensuring a crash-safe connection between the two rail devices of the vehicle seat and which is characterized by a simple cost-effective construction and a maximum individual flexibility for adjusting the seat on. In addition, a continuously variable manual drive for seat adjusters is to be provided which can be used universally and which enables a drive movement to be converted into an adjustment movement adapted to the events on the seat and in dependence on the requirements of any adjustment to be carried out.

These problems are solved according to the current invention. Advantageous and preferred developments of the inventions are given below.

A drive according to one embodiment of the invention is characterized in that the drive has a manual step switch mechanism which can be driven through a drive lever. In addition, a locking device is provided which blocks torque transfer on the output side but allows torque transfer on the drive side, and a transmission step is also provided which is coupled to the step switch mechanism on the drive side or on the output side.

With the drive according to the invention having a step switch mechanism for a longitudinal seat adjustment, the transmission ratio of the transmission step is selected so that the speed of the output element is faster than the speed of the drive shaft so that even with a drive lever, which can be operated on both sides as was hitherto used only for adjusting seat heights and inclines, an effective longitudinal adjustment of the seat can now be carried out.

Since the output-side gear element is always in engagement with the one rail device and is moved by manually operating the drive lever continuously in the one or other direction along the rail device, the solution produces a continuously variable drive which allows a precise adjustment of the longitudinal position of the seat even if it involves only small adjustment paths.

A further advantage of the drive according to the invention for the longitudinal seat adjustment lies in the fact that even during an adjustment process there is a high degree of security in the event of a crash since the gear element on the output side is always in engagement with the one rail mechanism and a displacement of the seat as a result of external forces is reliably prevented through the brake device. Using an active manually operable step switch mechanism instead of a motorized adjustment provides an additional simple and cost-effective solution.

Rail friction and rail pitch angles are insignificant in the case of an active longitudinal adjustment and do not prevent a precise length adjustment. This makes it possible, when necessary, to make the pitch angle of the rails so big that a separate seat adjustment can be eliminated. Thus longitudinal and height adjustment are coupled through the pitch angle of the seat rails.

The transmission step proposed according to the invention can be provided at several points of the drive. In a first preferred embodiment the transmission step is formed between a drive lever and the step switch mechanism. By way of example, force is transferred from the drive lever to the step switch mechanism through a toothed segment which is mounted on the rotary axis of the drive lever and engages in a positive locking element, more particularly a pinion, mounted on the drive axis of the step switch mechanism.

The drive axis of the step switch mechanism and the rotary axis of the drive lever thereby run parallel.

In another preferred embodiment, the transmission step is formed between the step switch mechanism and the locking device. For this embodiment, a transmission element is again preferred which is coupled both to the step switch mechanism and to the brake device and which engages, in particular, in a positive locking element mounted on the axis of the brake device. The transmission element is thereby preferably formed by the external teeth of a drive wheel normally provided in the case of a step switch mechanism.

In another embodiment the transmission step is formed between the locking device and the gear element on the output side. Force is transferred from the locking device to the gear element on the output side by means of a transmission element which is coupled on one side to the locking device and on the other to the gear element on the output side. The transmission element is preferably formed as a pinion which is mounted on the drive axis of the step switch mechanism and meshes with the gear element on the output side. The axes of the transmission element and the gear element on the output side thereby run parallel.

The locking device is any device which has the capacity to block forces which are introduced on the output side. A locking device of this kind is, in a preferred embodiment, a brake device as known from DE 41 20 617 AI.

However, the locking device according to the invention may also be a self-blocking gear which blocks forces introduced on the output side. A self-blocking gear of this kind is, for example, a tumbler gear which is known to one skilled in the art.

The step switch mechanism may be any drive device which produces a movement, more particularly a rotary movement, of an output element which is interrupted timewise (step-wise). As a rule, a drive force is likewise produced which is interrupted timewise.

A drive according to another embodiment of the invention for seat adjusters in motor vehicles is designed so that a step switch mechanism on the drive side and gear elements on the output side are connected together through a coupling device which in the non-actuated state maintains the power flow between the drive and the output-side gear elements by means of spring pre-loading and in the actuated state breaks the connection between the drive and the output-side gear elements. It is hereby reached that in the actuated state a passive seat adjustment is possible while in the non-actuated state an active adjustment is produced through the step switch mechanism.

The user now has the possibility of a rapid adjustment, for example, in order to move the seat quickly into the forward or backward position for climbing in or out of the vehicle, while a fine adjustment is undertaken by means of the step switch mechanism. There is thus a great deal of flexibility when making individual adjustments.

By uncoupling the output-side gear elements from the drive in the actuated state these can run freely along the one rail device, possibly in a longitudinal serration, without rotation or movement of the output-side gear elements becoming blocked by a brake device associated with the step switch mechanism.

In order to switch the coupling device in one preferred embodiment of the invention, there is an axially displaceable sleeve and an uncoupling operating element connected therewith, wherein the sleeve is moved axially against spring pre-loading during actuation of the uncoupling operating element to thereby break off the coupling between the drive and the gear elements on the output side. Through the axial displacement of the sleeve, positive locking elements of corresponding coupling regions are brought out of engagement, more particularly spring elements provided with positive locking elements are deflected so that the positive locking elements move out of engagement. By actuating the uncoupling operating element it readily becomes possible for the user to carry out a passive rapid adjustment.

Depending on the accessibility of the uncoupling operating element it may be necessary to assign the uncoupling operating element a switch element which when activated triggers the coupling and uncoupling process. This can be, for example, a press button which is preferably integrated into the drive lever so that an active adjustment and a passive rapid adjustment can be triggered or undertaken by the same operating element.

A continuously variable drive of the current invention is preferably designed so that the coupling device has positive locking elements or friction locking elements for carrying out the coupling process. The coupling device thereby has a first coupling region which is a constituent part of a gear element on the output side, and a second coupling region which is a constituent part of an element of the step switch mechanism or a brake device coupled to the step switch mechanism.

The coupling device preferably has an integral spring element acting radially or axially relative to the drive axis and provided with positive locking elements on the output side and on the drive side. During an uncoupling process a force is exerted opposite the pretensioning of the spring element in the axial or radial direction onto the spring element whereby the drive-side positive locking elements of the spring element move out of engagement with the corresponding positive locking elements of the brake device.

In a preferred embodiment of the invention, the spring element is formed in the manner of a plate spring whose spring region is divided up into several separately resilient segments with cogged free ends which can be coupled to associated positive locking elements of an output-side gear element or a part belonging to a step switch mechanism. A contour of the base surface of the spring element which is other than circular is assigned to a positive locking element of the corresponding other part and is connected in keyed engagement therewith.

The teeth of the adjoining segments of the plate spring are preferably off-set from each other by a fraction of a tooth spacing. This ensures that it needs, after an adjustment process, only a fraction of the tooth spacing until a new positive locking connection occurs between the corresponding positive locking elements of the plate spring and those of the step switch mechanism or brake device. After a rapid adjustment, a vehicle seat thus immediately returns back into its detent position. Thus, in order to ensure a reliable force transfer to the gear element on the output side, each two opposite segments of the plate spring have no stagger relative to each other so that in the non-actuated state always two segments of the plate spring are in engagement with the associated positive locking elements.

In a preferred embodiment of the drive, the step switch mechanism is formed as a drive acting on both sides for producing a rotary movement which takes place in one or other drive direction selectively starting from a neutral position of the drive lever, whereby the output-side gear element coupled to the second rail device is then only turned when the drive lever is moved away from the neutral position, whereas with a movement of the drive lever in the direction of the neutral position there is no rotation of the output-side gear element and thus no linear adjustment. Drives of this kind are characterized in that the user can directly carry out or influence an adjustment process by operating the drive lever in one or other swivel direction.

When using the drive according to the invention to make a longitudinal adjustment, the drive can produce a coupling in many ways between the output-side gear element and the one rail device.

Thus, the output-side gear element can be formed as a pinion or worm which engages in a longitudinally aligned toothed rod of the rail device. Alternatively, the output-side gear element is formed as a spindle nut or is connected to a spindle nut which engages in a longitudinally aligned spindle of the rail device. It is also within the scope of the invention to form the output-side gear element as a cable pulley which is connected to a cable, tensioned in the longitudinal direction of the second rail device and which can travel along the cable.

BRIEF DESCRIPTION OF THE DRAWINGS

The invention will now be explained in further detail with reference to the embodiments shown in the drawings in which:

FIG. 3 is a side view of the linear drive of FIG. 1;

DETAILED DESCRIPTION

Figure 1:
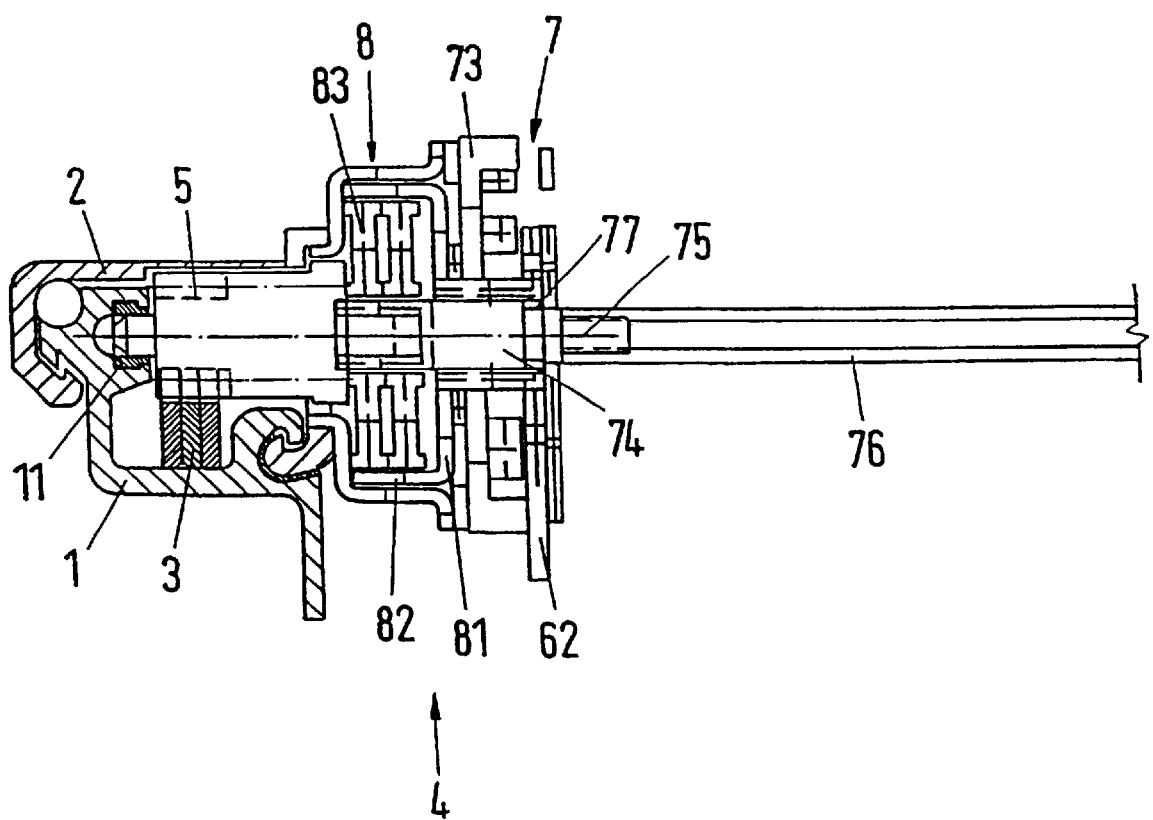
FIG. 1 is a sectional view of a continuously variable manual linear drive in connection with a seat rail.

FIG. 1 shows, in cross section, a manually operable active longitudinal adjustment of a seat. The longitudinal seat adjustment has as adjustment elements, which are longitudinally movable relative to each other, a bottom rail 1 connected to a bodywork base of a motor vehicle (not shown) and a top rail 2 connected to a vehicle seat (not shown). The top rail 2 and the bottom rail 1 are hooked together in known ways so that a secure connection is provided between the bottom rail 1 and top rail 2 even in the event of a crash.

The bottom rail 1 has teeth which are formed as a toothed rod 3. To move the top rail 2 relative to the bottom rail 1 there is a linear drive 4 which is connected to the top rail 2 and which has as an output-side gear element 5, an output pinion, which meshes with the teeth of the toothed rod 3. The output pinion 5 is thereby supported rotatable on a bearing point 11 of the bottom rail 1.

The linear drive 4 has as essential functioning units: drive means 6 (shown in FIG. 2), a step switch mechanism 7 and a brake device 8. As can be seen in particular from FIGS. 2 and 3, the drive means 6 consist of a drive lever 61 and a drive segment 62 which are connected together in U-fashion so that the drive lever 61 runs parallel to, and at the side of, the seat rails 1, 2 and is thus readily accessible to the user. The drive lever 61 is supported on a bearing block 63 which is fixed on the top rail 2. The drive lever 61 and the drive segment 62 are able to swivel about a rotary axis 620 which runs parallel to a drive axis 75 of the step switch mechanism 7.

The neutral position of the drive lever 61 is defined by a resetting spring 64 (see FIG. 2) which, when the drive lever 61 is deflected out from the neutral position, exerts a resetting force on the drive lever 61.

The drive segment 62 meshes with a drive pinion 77 mounted on the drive axis 75 of the step switch mechanism 7. The drive segment 62 and the drive pinion 77 form a transmission gear whose transmission ratio can be fixed by the diameter of the drive segment 62 and the drive pinion 77. The transmission ratio is preferably fixed so that a user, when swivelling the drive lever 61 out from the neutral position, can carry out a precise longitudinal adjustment without much effort.

Figure 2:
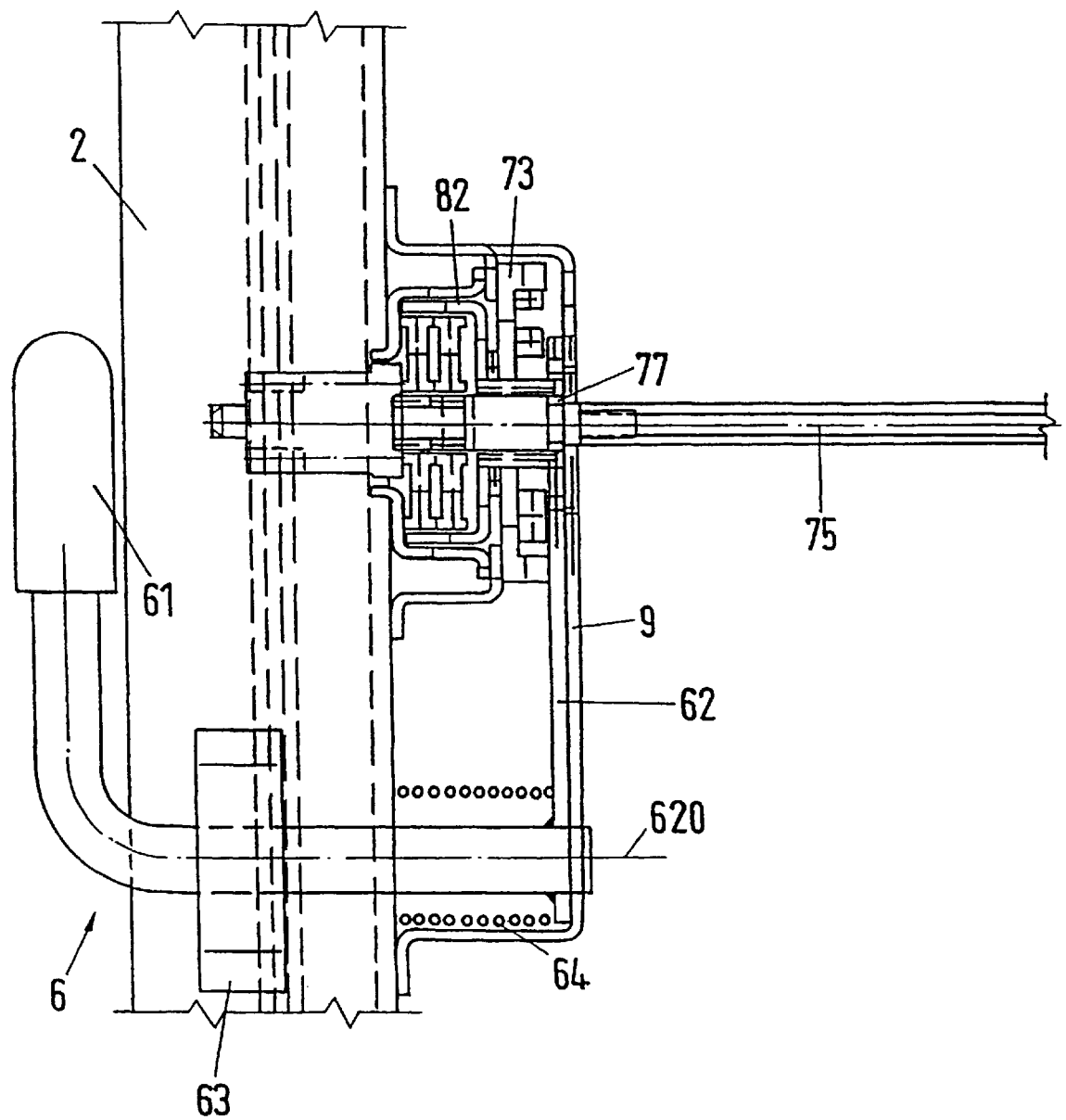
FIG. 2 is a plan view of the linear drive of FIG. 1.

The step switch mechanism 7 has locking means and a drive wheel 73 with internal teeth which are mounted together with the drive pinion 77 on a stepped bolt 74 which is mounted along the drive axis 75 (see FIG. 2). This will be explained in further detail with reference to FIGS. 4a and 4b. The stepped bolt 74 has, on the drive side, a shank which engages with keyed engagement in a connecting shaft 76 which is connected to the opposite rail of the vehicle seat and has at the end a further output pinion which engages, in corresponding manner, teeth of the opposite bottom rail of the seat.

The step switch mechanism 7 and the drive segment 62 are covered according to FIGS. 2 and 3 by a cover plate 9 which is likewise supported on the stepped bolt 74.

On the output side, the drive wheel 73 is adjoined by the brake device 8. To transfer force from the drive wheel 73 to the brake device 8, the drive wheel 73 is connected to a follower wheel 81 which has cylinder-sleeve type follower claws 82. The follower claws 82 are mounted with keyed engagement between substantially radial stop faces of the brake jaws 83.

Figure 9:
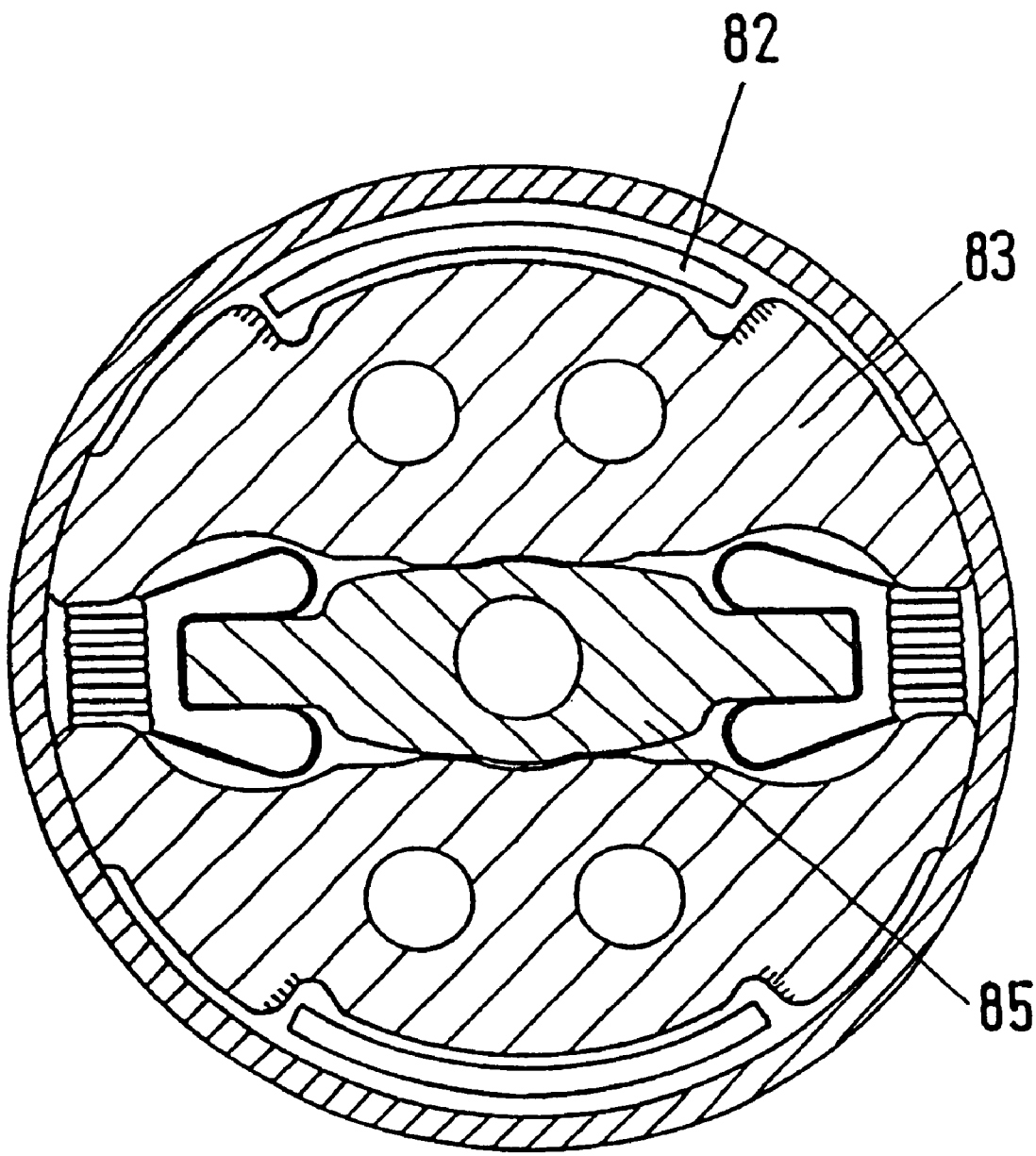
FIG. 9 shows a radial section through the brake device of the drive of FIGS. 1 and 5.

A force on the drive side is transferred by the drive wheel 73 through the follower wheel 81 and further positive locking elements (not shown) to a wing part 85 which serves as the coupling element and which is connected with keyed engagement to the output pinion 5 to transfer a rotary movement to same. The follower claws 82, the brake jaws 83 and the wing part 85 are shown individually in the sectional view of FIG. 9. The brake device 8 used is known per second end 10B of the grommet 10, such as from DE 41 20 617 AI. Through the brake device 8, it is ensured that when torque on the output-side acts on the output pinion 5 and the wing 85, the brake jaws 83 are clamped against the inner wall of the brake housing so that the transfer of torque is thereby blocked. Uncontrolled adjustment of the vehicle seat is thereby prevented.

During displacement of the drive lever 61, the drive segment 62 meshes with the drive pinion 77 mounted on the drive axis 75 according to the direction of operation of the drive lever 61, and the drive pinion 77 is thereby turned. The construction and function of the step switch mechanism 7 will be explained below with reference to FIGS. 4a and 4b.

Figure 4A:
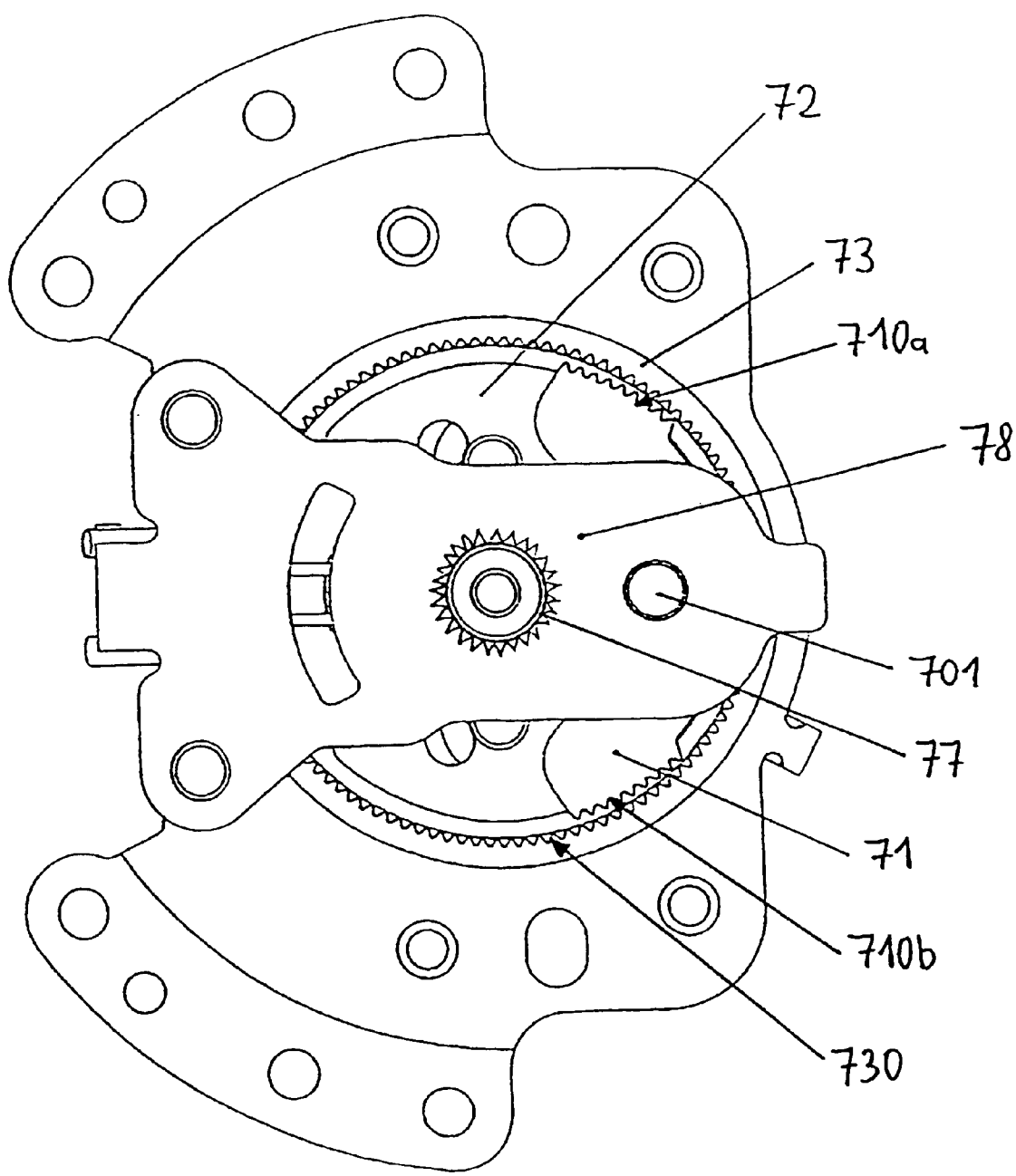
FIG. 4a is a plan view from the drive side of the step switch mechanism of the linear drive of FIG. 1.
Figure 4B:
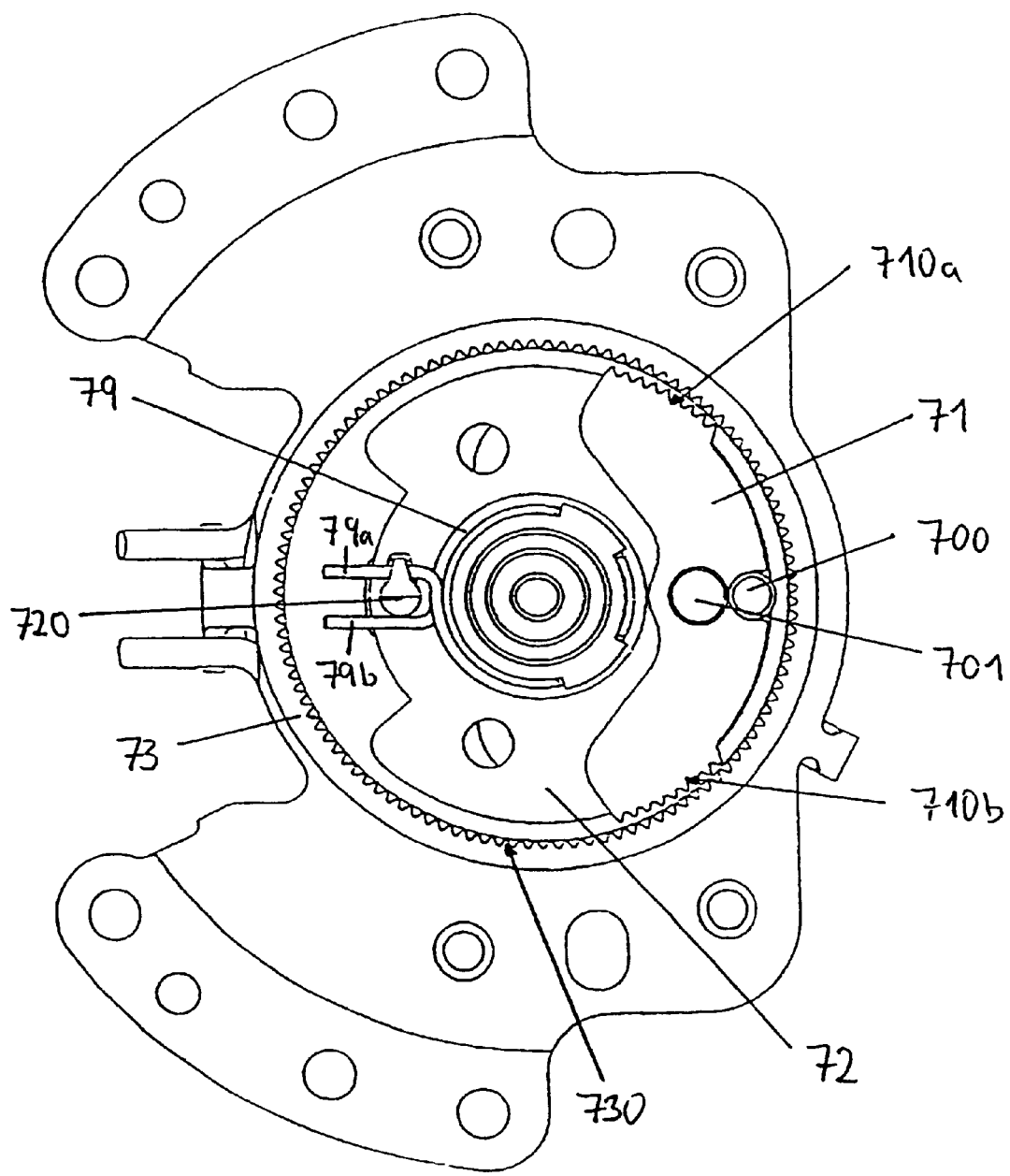
FIG. 4b is a plan view from the drive side of the step switch mechanism of the linear drive of FIG. 1, with the lever plate not shown.

FIGS. 4a and 4b show a rocker arm 71 which has two symmetrically arranged toothed regions 710a, 710b provided on a circular circumference so that, depending on the drive direction, one of the toothed regions 710a, 710b can be brought into engagement with the internal teeth 730 of the drive wheel 73. The rocker arm 71 is connected in a first bearing point 700 to a holding plate 72 and in a second bearing point 701 to a lever plate 78 which is rotationally secured to the drive pinion 77. A torsion spring 79 is provided on the holding plate 72, symmetrical with the drive axis, and has two spring ends 79a, 79b which adjoin a stud 720 of the holding plate 72.

When the drive lever 61 swivels and thus the lever plate 78 is turned through the pinion 77, the bearing point 701 between the lever plate 78 and the rocker arm 71 is also turned. Since the rocker arm 71 is likewise mounted in the bearing point 700 of the rocker arm 71 and holding plate 72, when the lever plate 78 rotates, torque is applied to the holding plate 72. However the rotation of the holding plate 72 is counteracted by the torsion spring 79 which is supported, on the one hand, on the stud 720 of the holding plate 72 and, on the other, on a stud (not shown) of the cover plate 9.

As a result of this spring force, when the holding plate 72 is turned out of the neutral position, a resetting torque is exerted on the holding plate 72 so that it endeavors to remain in the neutral position. The torsion spring 79 thereby produces the necessary counter moment which ensures the rocker arm 71 moves safely to engage in the teeth 730 of the drive wheel 73.

When the drive lever 61 (through the adjusting segment 62 and the drive pinion 77) or the lever plate 78 swivels back into the neutral position, the torque arising on the rocker arm 71 is lifted so that the toothed area 710a, 710b of the rocker arm 71 which is currently in engagement moves out of engagement with the internal teeth 730 of the drive wheel 73 and during a resetting movement no forces are transferred onto the drive wheel 73.

The linear drive 4 illustrated in FIGS. 1 to 4b thus enables a continuously variable adjustment of the seat top rail 2 relative to the seat bottom rail 1. A transfer of force to the output pinion 5 and thus a longitudinal adjustment of the seat take place according to the selected displacement direction from the neutral position when the drive lever 61 is manually operated by the user. Since the output pinion 5 is always in engagement with the toothed rod 3 of the bottom rail 1 of the seat, and more particularly during an adjustment process, there is no danger that the vehicle seat can slip through in the event of a sudden force occurring during the adjustment process, such as, for example, in the event of a crash.

Figure 5:
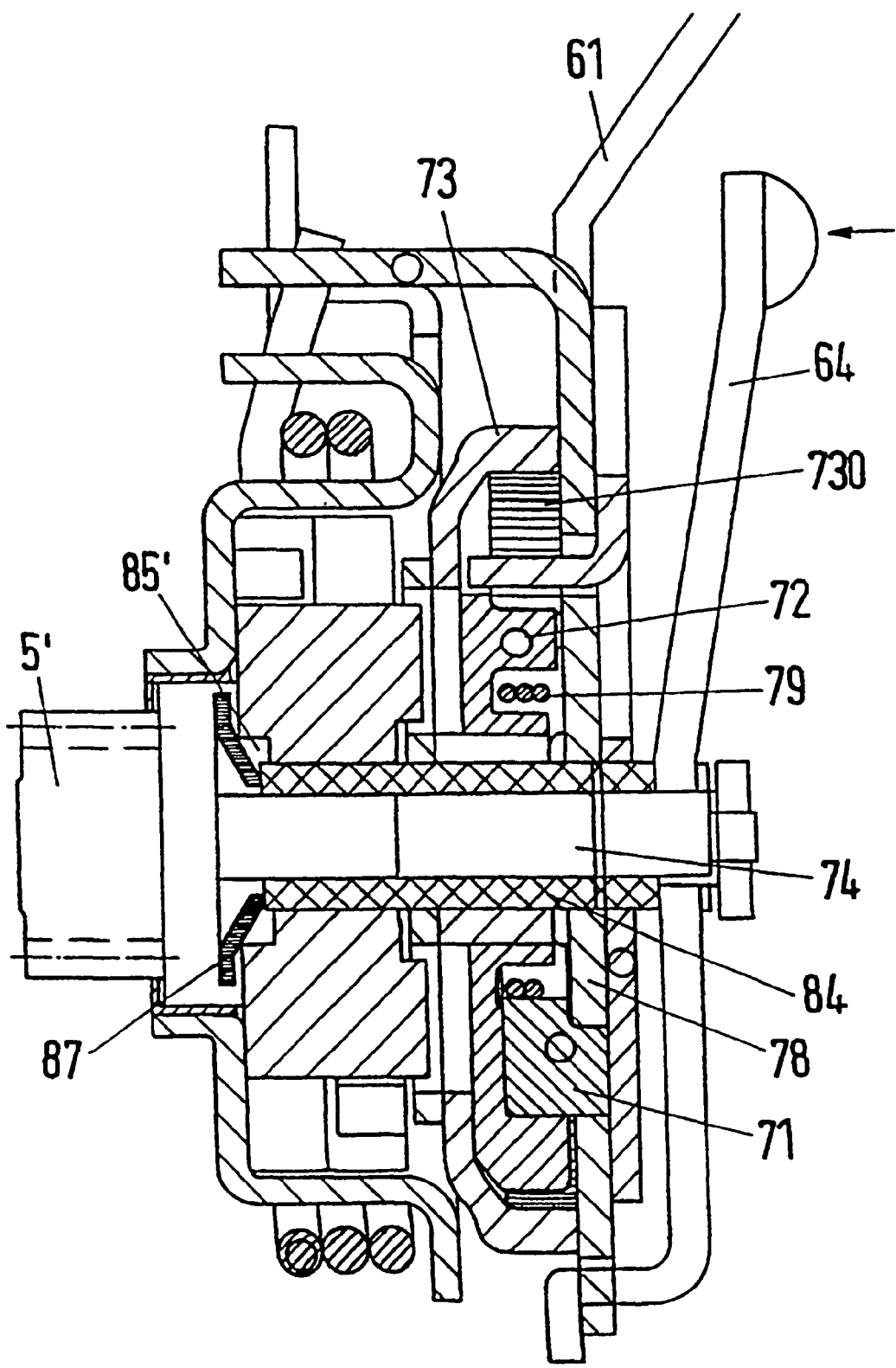
FIG. 5 is a sectional view of an alternative embodiment of a linear drive for a longitudinal adjustment of a seat, which allows in addition a rapid adjustment.

FIG. 5 shows an alternative embodiment of the adjustment drive which additionally allows a selective rapid adjustment. For a rapid adjustment, an output pinion 5'—as described below—is uncoupled from the coupling element of the brake device 8 so that the output pinion 5' can run freely in the teeth 3 of the bottom rail 1 and a rapid adjustment of the seat is thus possible through a force acting from outside, such as, for example, by the user shifting his sitting position.

The adjustment drive illustrated in FIG. 5 corresponds to the construction of the adjustment drive 4 of FIGS. 1 to 4a. The rocker arm 71, the holding plate 72 and the torsion spring 79 can be seen better here than in FIGS. 1 and 2. A significant difference exists here in that the lever plate 78 is not connected to the drive lever 61 through a drive pinion and drive segment, instead the drive lever 61 (as indicated) is set directly on the lever plate 78. A design of this kind is advisable if the adjustment drive 4 is not mounted between the two seat rails of the vehicle seat, but is mounted in a readily accessible manner next to one of the seat rails. The rapid adjustment of the seat which will be described below can be used equally well when the adjustment drive is mounted in the region between the parallel seat rails which is not accessible to the user. In such a case, as described in FIGS. 1 to 3, the drive lever 61 is then coupled to the step switch mechanism 7 through a drive segment 62 and a drive pinion 77.

For a passive rapid seat adjustment which can be undertaken selectively by a user, a switchable coupling device is provided which couples with switching action an element of the step switch mechanism 7 or brake device 8 to the output element 5. The coupling device in the non-activated state thereby maintains the power flow between the drive and the output element 5' and breaks off this power flow in the activated state.

In the embodiment of FIG. 5, the coupling device has a plate spring 87 which can be coupled in interaction with an axially displaceable sleeve 84 and an uncoupling operating element 64 to the output element 5' with switch action. The axially displaceable sleeve 84 is, for this purpose, supported at its output-side end on the plate spring 87 and at its drive-side end, it adjoins the uncoupling operating element 64.

Figure 6:
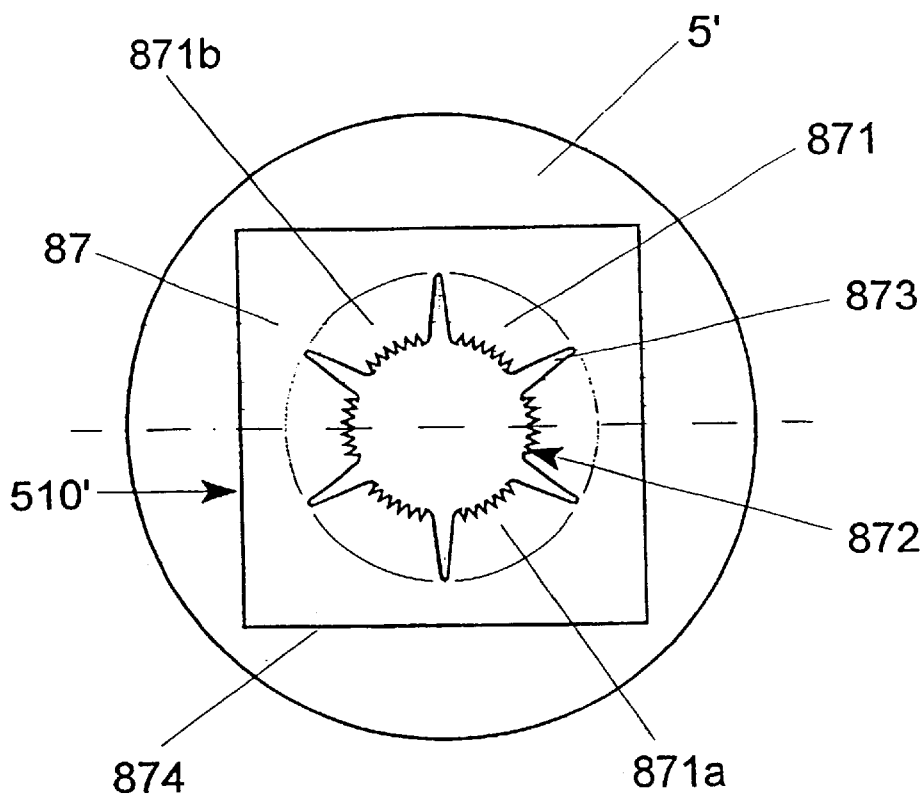
FIG. 6 is a diagrammatic view of a plate spring of an adjusting drive according to FIG. 5 serving as a coupling device.

According to FIG. 6, the plate spring 87 has a spring area which is divided by radial incisions 873 into several individually resilient segments 871 with cogged free ends. Teeth 872 of the cogged free ends provide drive-side positive locking elements of the plate spring 87 which as will be explained below—can be brought into switching engagement with matching teeth of a positive locking element of the brake device 8 in order to transfer the rotary movement to the output pinion 5'.

The teeth 872 of adjoining segments 871 of the spring area are thereby off-set from each other by a fraction of the tooth division so that after a passive rapid adjustment it only needs a fraction of the tooth division until a new positive locking engagement is produced between the resilient segments 871 of the plate spring 87 and the corresponding positive locking elements of the brake device 8.

The number of segments 871 is even in the embodiment of FIG. 6. There are six segments 871 provided, with the teeth 872 of opposite segments (such as 871a, 871b) each having no stagger so that overall there are three offset segments 871a, 871b. By eliminating a stagger between opposite segments 871a, 871b it is ensured that the teeth of two segments 871 are always available for keyed engagement.

The plate spring 87 forms on the output side a square contour 874 and is in permanent keyed engagement with a likewise square indentation 510' of the output element 5'. Through the contour 874 of the plate spring 87 being other than circular, a positive locking connection with the output element 5' becomes readily possible.

Figure 8:
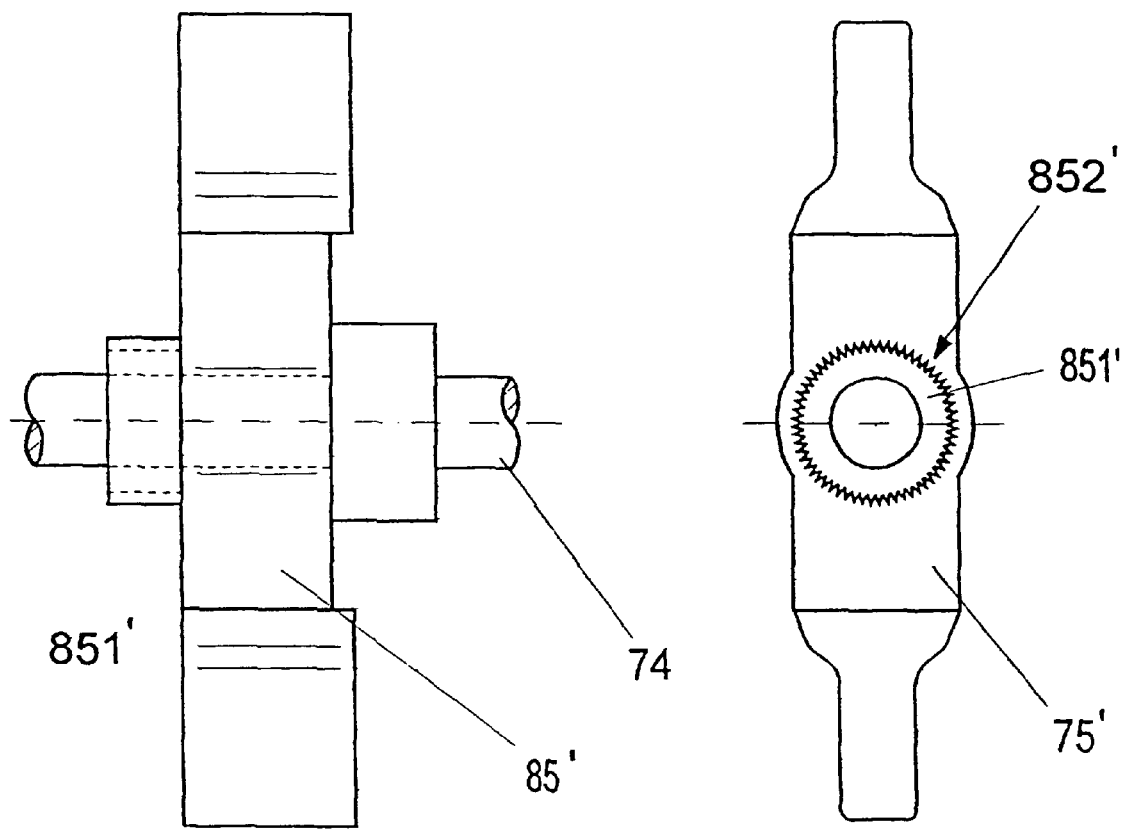
FIG. 8 is a diagrammatic view of a wing part of the brake device which in order to transfer torque can be brought into engagement with the plate spring of FIG. 6 or 7.

In order to transfer a drive force to the plate spring 87 or to the output element 5', which is connected with positive engagement to the plate spring 87, a positive locking element of the brake device 8, to which the drive-side forces are transferred, engages in the internal teeth 872 of two opposite segments 871a and 871b of the plate spring 87. The positive locking element is, in the illustrated embodiment, a wing element 85' corresponding to the wing element 85 of FIG. 9. The wing element. 85' is only indicated in the sectional view of FIG. 5 but is illustrated separately in FIG. 8.

The exact form of the wing element is thereby variable depending on the design of brake device 8. It is only important that a drive force exerted on the drive lever 61 is transferred by means of suitable positive locking elements through the step switch mechanism 7 and the brake device 8 to the wing element 85' and from this through the coupling device to the output pinion 5'. According to FIG. 8, the wing element 85' has a positive locking element 851' protruding axially on the output side and provided with external teeth 852' which engage with the teeth 872 of the plate spring 87 in the non-activated state of the coupling device.

An uncoupling process for a rapid adjustment is thereby triggered when the uncoupling operating element 64 is moved in the axial direction by the user and the axially displaceable sleeve 84 is thereby pushed against the spring 87, pretensioning the plate spring 87 axially against the resilient segments 871 of the plate spring 87 so that the segments 871 or the teeth 872 are bent backwards and move out of engagement with the teeth 852' of the wing element 85'. For a rapid adjustment the top and bottom rails 1,2 of the seat can now be moved rapidly relative to each other with the output pinion 5' running freely in the toothed rod 3.

As soon as the uncoupling operating lever 64 is released the sleeve 84 is pushed back axially through the spring force of the plate spring 87 whereby the positive locking elements 872, 852' of the plate spring 87 and of the wing element 85' move back into positive locking engagement again and rotation of the output pinion 5' in the toothed rod 3 as a result of forces on the output side is blocked by the brake device 8. A manual active longitudinal adjustment can now be carried out again.

Figure 7:
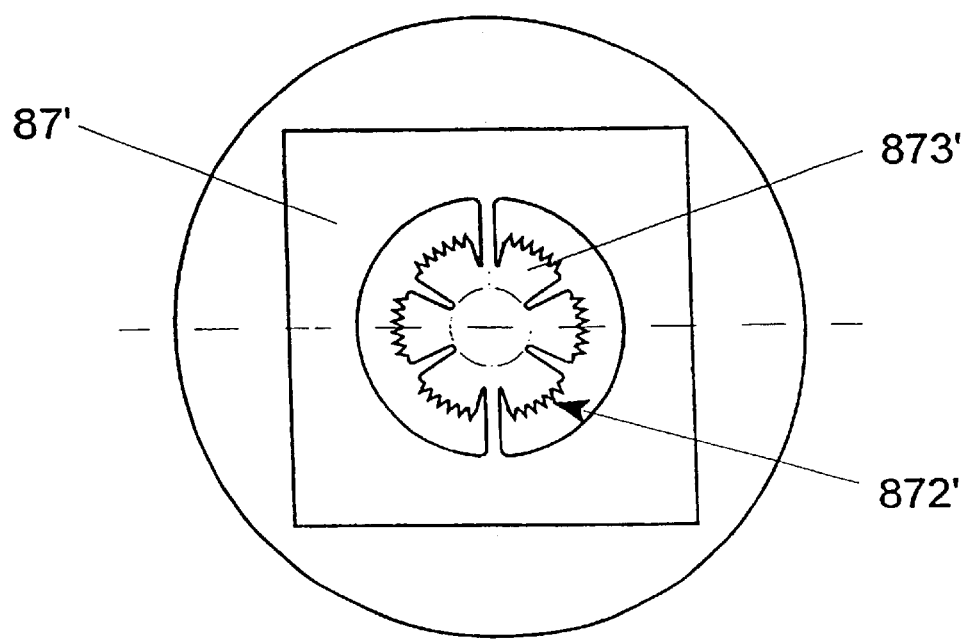
FIG. 7 shows an alternative embodiment of plate spring of FIG. 6.

FIG. 7 shows an alternative view of a plate spring 87' in which teeth 872' on the individual segments 871' lie on the outside. Correspondingly, the wing element 85' is provided with counter teeth formed as internal gearing. Otherwise, the coupling device corresponds to the coupling device of FIGS. 5 and 6.

Figure 10:
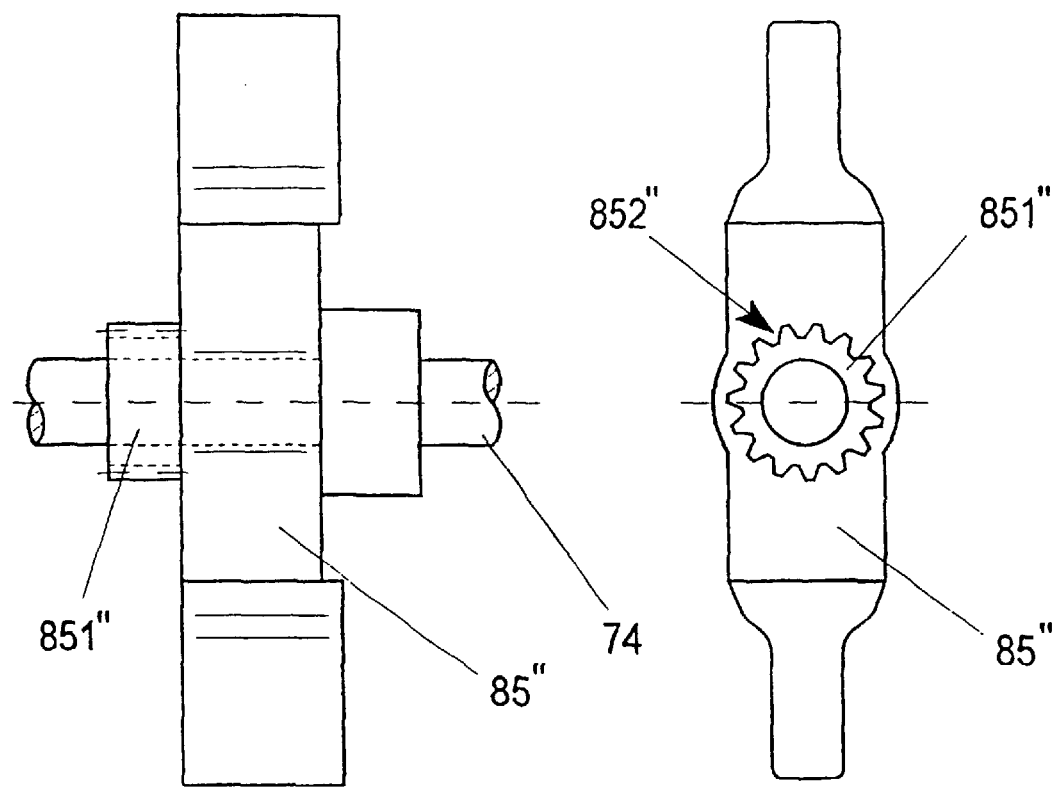
FIG. 10 shows a diagrammatic view of a wing part of the brake device which for transferring torque has a coupling region with positive locking elements.
Figure 11:
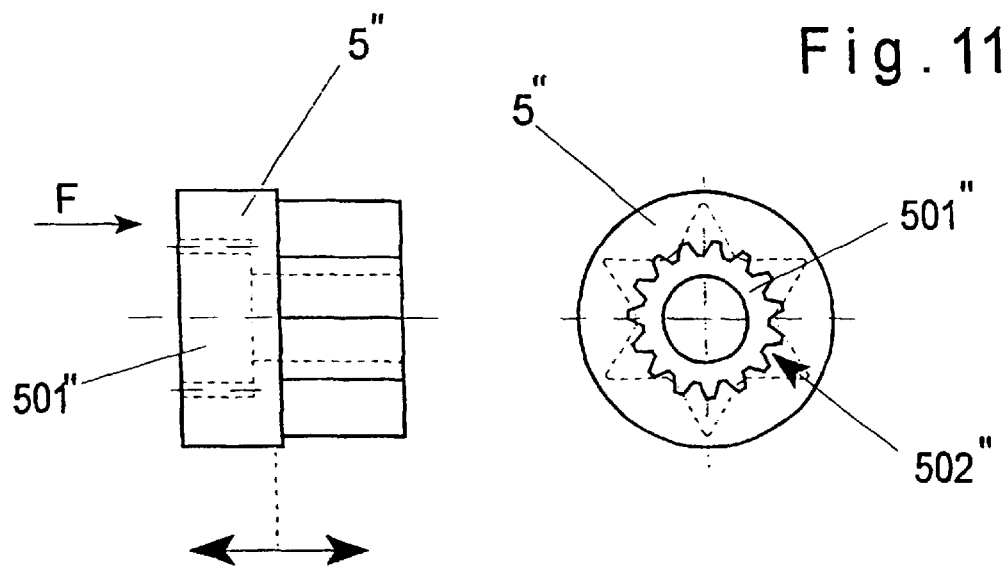
FIG. 11 shows a section through an output element which has a coupling region corresponding to the coupling region of the wing part of FIG. 10.

FIGS. 10 and 11 show an alternative variation of a switchable coupling device for a drive according to FIG. 5 in which a first coupling region 852" is formed on the wing element 85" and a second coupling region 502" is formed on the drive element 5'. In the non-activated state, the coupling regions 852" and 502" engage in each other through spring pretensioning and, during activation of the coupling device, are displaced axially relative to each other to thereby pass out of engagement.

Thus, the wing element 85" has a projection 851" wherein the first coupling region 852" comprises external teeth and projecting axially into the output element 5". In the output element 5", there is a corresponding recess 501" wherein the second coupling region 502" comprises internal teeth. The wing 85" and the output element 5" are thereby mounted on the stepped bolt 74 (see also FIGS. 1 and 5). Spring pretensioning is produced again, for example, by a plate spring whose spring region is fixed on the circumference of the sleeve 84 (not shown). The plate spring in this case does not, however, serve as a coupling element. Other spring elements are also possible as plate springs. It matters only that a pretension is produced which ensures that the coupling regions 852" and 502" of the output element 5" and wing element 85" engage in each other in the non-activated state of the coupling device so that the power flow is maintained between the drive and output element 5".

The construction of the linear drive corresponds, apart from the design of the coupling device, to the construction of FIG. 5.

An uncoupling process for rapid adjustment is thereby triggered by actuating the uncoupling operating element 64 so that the axially displaceable sleeve 84 is pushed against the spring force of an axially acting spring against the output element 5" so that this is moved axially opposite the wing element 85" and the toothed area of the second coupling region 502" thereby moves out of engagement with the toothed area of the first coupling region 852" of the wing element 85". The output element 5" can now run freely in the toothed rod 3 of the bottom rail 1 so that the top and bottom rails 1,2 of the seat can be moved quickly relative to each other by the user shifting the user's sitting position. The axial displaceability of the sleeve 5" in the event of an axial force F occurring is shown by a double arrow in FIG. 10.

If the uncoupling operating element 64 is again released by the user, then the sleeve 84 is pushed back axially as a result of the pretension of the axially acting spring so that the teeth of the coupling regions 502", 852" of the output element 5" and of the wing element 85" again move into engagement.

As an alternative, with the embodiment of FIGS. 10 and 11 it is proposed that the relative movement of the output element 5" and wing element 85" is caused not by a sleeve 84 according to FIG. 5, but by other suitable means which are coupled to the uncoupling operating element 64. It is only important that during actuation of the uncoupling operating element 64, that a relative movement takes place between the spring-loaded parts of the coupling device so that they move out of engagement.

By way of example, as an alternative an output element 5" is provided which, during actuation of the uncoupling operating element 64, is moved axially against a spring force through a Bowden cable. In order to produce a pretensioning, a spring element is fixed, by way of example, on a circumferential collar of the output element 5" and exerts a tensile force on the output element 5" so that this and the wing element 85" engage in each other in the non-actuated state (not shown).

If the linear drive 4 according to FIG. 1 is mounted between the seat rails 1,2 then the uncoupling operating element 64 or lever according to FIG. 5 would not be accessible to the user. In this case it is proposed that the uncoupling operating element 64 is operated through a switch element (not illustrated) which triggers an uncoupling or coupling process. The switch element can be a press button which is preferably integrated in the readily accessible drive lever 61.

A coupling of the output-side gear element to a seat rail can be undertaken in many ways. In alternative embodiments of the linear drive the output is not designed as a combination of output pinion and toothed rod, but more particularly in one of the following variations:

A. The output-side gear element is formed as a worm which engages in a longitudinally aligned toothed rod of a seat rail.

B. The output-side gear element is formed as a spindle nut which engages in a longitudinally aligned rigidly fixed spindle of a seat rail. The spindle thereby has a spindle gearing which engages with internal teeth of the spindle nut. The spindle nut has furthermore an external worm gearing which meshes with the teeth of an output worm of the linear drive. Rotary movement of the output worm is thereby transferred to the spindle nut which is moved together with the drive worm in the longitudinal direction of the spindle.

Figure 14:
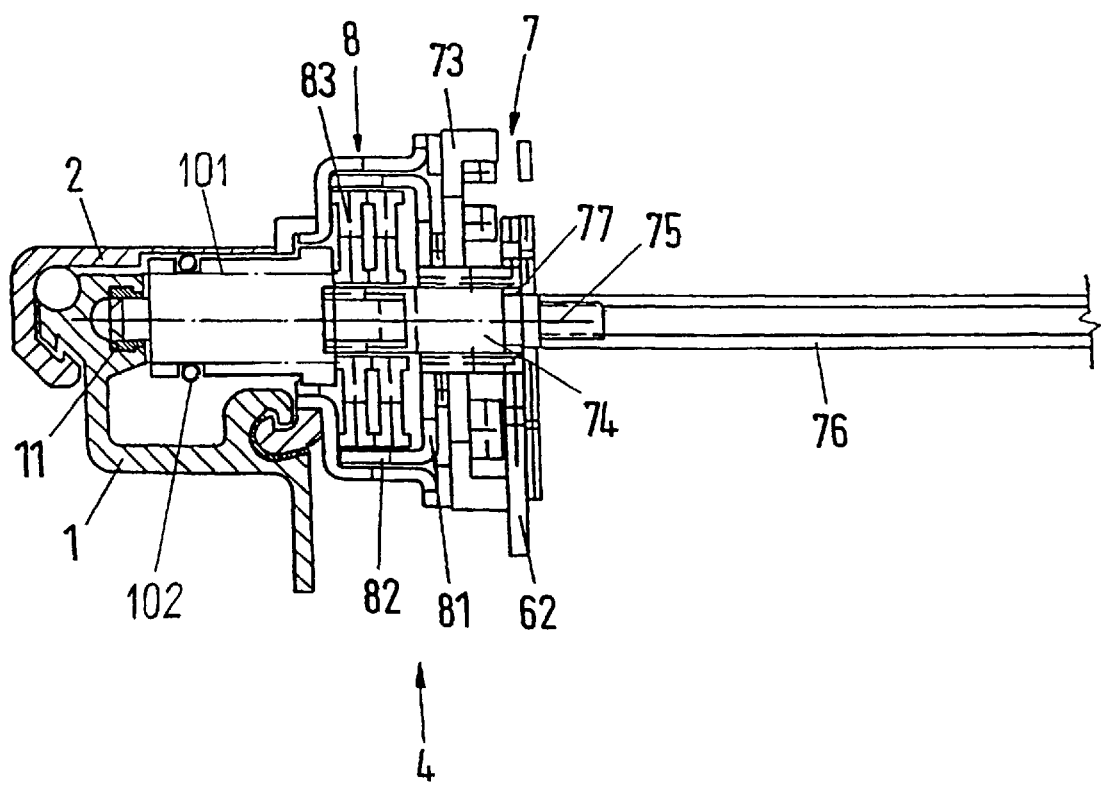
FIG. 14 is a sectional view of a continuously variable manual linear drive in connection with a seat rail, having a cable pulley and a cable.

C. The output-side gear element is a cable pulley 101 which is connected to a cable 102 tensioned in the longitudinal direction of one seat rail and is moved during displacement movement together with the other seat rail along the cable 102, as shown in FIG. 14.

Figure 12:
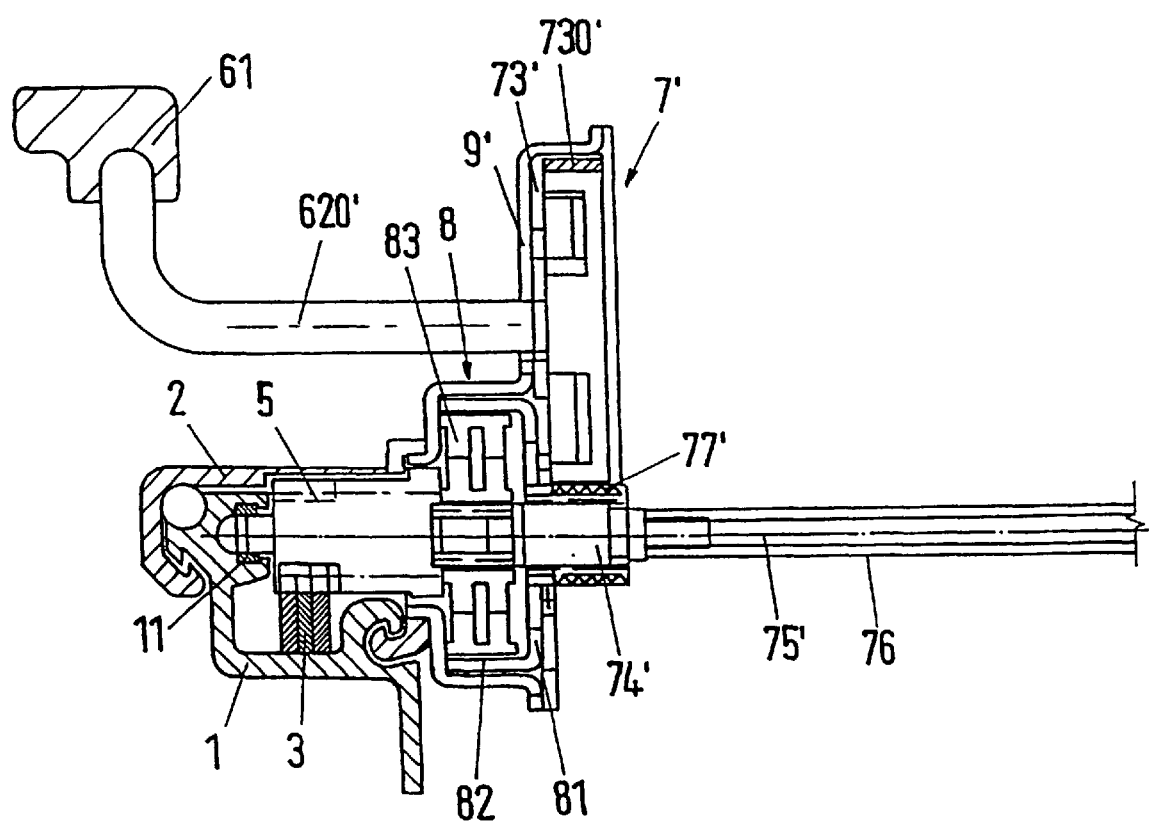
FIG. 12 is a sectional view of a second embodiment of a continuously variable manual linear drive in connection with a seat rail.

FIG. 12 shows a further embodiment of a drive acting on both sides which is used as a linear drive for a longitudinal adjustment of the seat. The basic construction of the drive corresponds to the construction of the drive 4 of FIG. 1. Different from the drive of FIG. 1, however, the transmission step is not formed between the drive lever 61 and step switch mechanism 7 but is now between the step switch mechanism 7' and the locking device 8. The transmission is thus formed in the drive unit itself. The embodiment of FIG. 12 will now be explained only where it differs from the embodiment of FIG. 1.

A drive lever 61 which is able to swivel about a rotary axis 620' introduces an adjusting force into a step switch mechanism 7' which is formed, for example, according to FIGS. 4*a* and 4*b*. The step switch mechanism 7' has, in particular, a drive wheel 73. In the illustrated embodiment, the drive wheel 73 has, in addition to the internal teeth illustrated in FIGS. 4*a* and 4*b,* also external teeth 730'.

The brake device 8 and the output element 5 of the adjusting drive are, in the embodiment of FIG. 12, mounted on an axis 75' which runs parallel to the rotary axis 620' of the drive lever 61.

A coupling between the step switch mechanism 7' and the brake device 8 is produced through the external teeth 730' of the drive wheel 73' and the teeth of a pinion 77' of smaller diameter which in turn is mounted on a stepped bolt 74' which is mounted along the axis 75' of the brake device 8. The toothed region between the teeth 730' of the drive wheel 73' and the teeth of the pinion 77' thereby produces the desired transmission.

The drive pinion 77' is connected to the follower wheel 81 of the brake device 8 which transfers force on the drive side through the step switch mechanism 7 to the pinion 77', to a wing part serving as the coupling element, as described in relation to FIG. 1. A cover 9' closes both the step switch mechanism 7' and the brake device 8.

The embodiment illustrated in FIG. 12 is characterized in that the transmission step is provided between the step switch mechanism 7' and the brake device 8 wherein the relevant axes of the transmission step are arranged off-set from each other and the transmission ratio is fixed by the size of the relevant pinion (drive wheel 73', pinion 77').

It is pointed out that a transfer of force from the step switch mechanism 7' to a positive locking element (pinion 77') coupled to the brake device 8 can also be carried out through elements other than the drive wheel 73' of the step switch mechanism 7'. For example, a pinion which is connected to the drive wheel 73. It is only important that the drive-side force in the step switch mechanism 7' is transferred to a toothed part which, to form a transmission, has a larger diameter than the positive locking element (pinion 77') which is coupled to the brake device.

Figure 13:
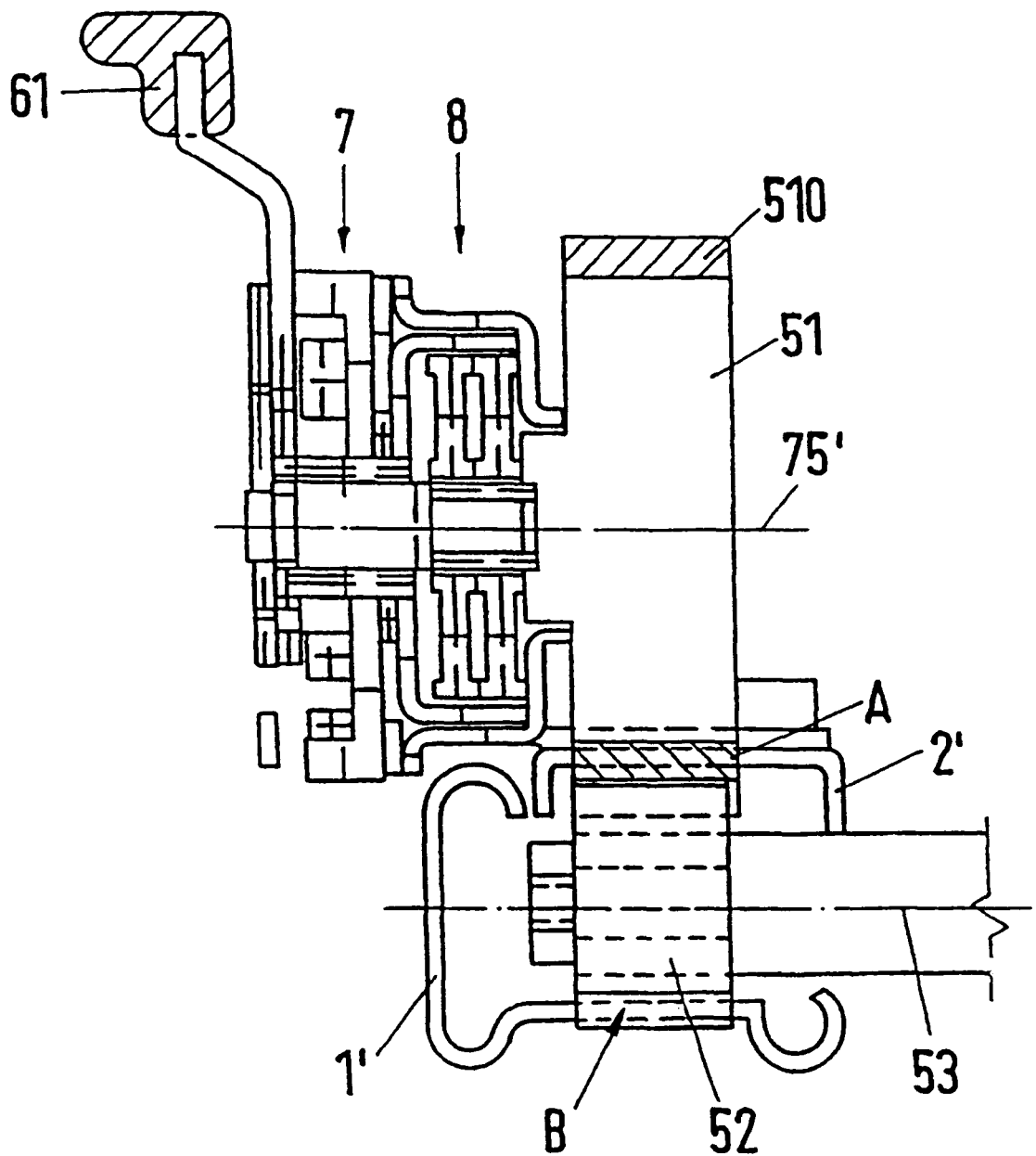
FIG. 13 is a sectional view of a third embodiment of a continuously variable manual linear drive in connection with a seat rail.

FIG. 13 shows a further embodiment of a drive acting on both sides, which is used as a linear drive for longitudinally adjusting the seat. An adjusting movement triggered through a drive lever 61 is transferred to a gear element on the output side through a step switch mechanism 7 and a brake device 8, as described in relation to FIG. 1. With this embodiment, a transmission step is mounted between the brake device 8 and the output-side gear element.

To this end, rotary movement is first transferred from the brake device 8 to a transmission pinion 51 having teeth 510 and connected with positive engagement to elements of the brake device 8. The transmission pinion 51 meshes in a transmission area A with the teeth of an output pinion 52 which in turn engages in a toothed region B in a longitudinal gearing (not shown) of the bottom rail 1 of a seat adjuster. The illustrated drive is thereby connected to the top rail 2' of the seat adjuster as already explained with reference to FIG. 1 and known.

The rotary axis 53 of the output pinion 52 runs parallel to the rotary axis of the transmission pinion 51 which is mounted on the rotary axis 75' of the brake device 8. As a result of the different diameters of the transmission pinion 51 and output pinion 52, rotary movement undertaken through the drive lever 61 is transferred with a transmission ratio to the output pinion 52.

In alternative embodiments of the invention it is not a brake device 8 which is used as a locking device, but instead, a self-locking gear which as a result of the self-locking action blocks the introduction of torque on the output side. One example for a self-locking gear of this kind is a tumbler gear, as known per se to an expert in the field of the current invention.

The invention is not restricted in its use to the embodiments mentioned above. It is only important for the invention that the drive has a transmission step which is coupled on the drive side or output side to the drive, and the possibility exists of connecting the step switch mechanism and output-side gear elements together through a switchable coupling device which enables selectively a passive rapid adjustment.

What is claimed is:

1. A continuously variable manual drive assembly for seat adjusters comprising:
  a first rail device and a second rail device which are displaceable relative to each other in a longitudinal direction; and
  a drive having:
    a manual step switch mechanism which can be driven through a drive lever;
    a locking device, coupled to the step switch mechanism, which blocks torque transfer on an output side but enables torque transfer on a drive side;
    at least one transmission step which is coupled on one of the drive side and the output side to the step switch mechanism; and
    an output-side gear element;
  wherein the first rail device is connected to the output-side gear element which, in turn, is coupled to a longitudinally aligned part of the second rail device.

2. The assembly according to claim 1 wherein the transmission step is formed between a drive lever and the step switch mechanism.

3. The assembly according to claim 1 wherein the transmission step is formed between the step switch mechanism and the locking device.

4. The assembly according to claim 3 wherein a force transfer from the step switch mechanism to the locking device is accomplished through a transmission element, which engages a positive locking element, wherein the positive locking element is mounted on the axis of the locking device and is coupled to the locking device.

5. The assembly according to claim 4 wherein the transmission element is formed by external teeth on a drive wheel of the step switch mechanism.

6. The assembly according to claim 1 wherein the transmission step is formed between the locking device and the gear element on the output side.

7. The assembly according to claim 6 wherein a force transfer from the locking device to the output-side gear element is by means of a transmission element which is coupled on one side to the locking device and on another side to the gear element on the output side.

8. The assembly according to claim 7 wherein the transmission element is formed as a pinion which is mounted on the drive axis of the locking device and meshes with the output-side gear element, with the output-side gear element being mounted on an axis parallel to the drive axis of the locking device.

9. The assembly according to claim 1 wherein the step switch mechanism is a drive mechanism acting on both the output side and the drive side to produce a rotary movement which takes place selectively in one of a first drive direction and a second direction, opposite the first drive direction, starting from a neutral position of the drive lever such that an output-side gear element is turned when the drive lever is moved away from the neutral position, whereas when the drive lever is in the neutral position, there is no rotation of the output-side gear element.

10. The assembly according to claim 1 wherein drive-side forces are transferred through at least one element of the locking device to a coupling device which is coupled to the output-side gear element for the purpose of transferring torque.

11. The assembly according to claim 10 wherein the coupling device is designed so that it can switch to one of a non-activated and an activated state for a manual passive seat adjustment such that the coupling device in the non-activated switching state maintains the power flow between the drive and the output-side gear element and in the activated switching state, the coupling device breaks off the power flow between the drive and the gear element on the output side.

12. The assembly according to claim 1 wherein the output-side gear element is formed as one of a pinion and a worm which engages a toothed rod of the second rail device.

13. The assembly according to claim 1 wherein the output-side gear element is one of a spindle nut and connected to a spindle nut which engages in a longitudinally aligned spindle of the second rail device.

14. The assembly according to claim 1 wherein the output-side gear element is formed as a cable pulley which is connected to a cable tensioned in the longitudinal direction of the second rail device.

15. The assembly according to claim 1 wherein the first and second rail devices form a top rail and a bottom rail of a longitudinal seat adjuster.

16. The drive according to claim 1 wherein the locking device is a brake device.

17. The drive according to claim 1 wherein the locking device is formed by a self-locking gear.

18. The drive according to claim 17 wherein the self-locking gear is a tumbler gear.

19. A continuously variable manual drive assembly for seat adjusters comprising:
- a first rail device and a second rail device which are displaceable relative to each other in a longitudinal direction; and
- a drive having:
  - a manual step switch mechanism which can be driven through a drive lever;
  - a locking device, coupled to the step switch mechanism, which blocks torque transfer on an output side but enables torque transfer on a drive side;
  - at least one transmission step which is coupled on one of the drive side and the output side to the step switch mechanism; and
  - an output-side gear element;
- wherein the first rail device is connected to the output-side gear element which, in turn, is coupled to a longitudinally aligned part of the second rail device and wherein the transmission step is formed between a drive lever and the step switch mechanism and wherein a force transfer from the drive lever to the step switch mechanism is undertaken by means of a transmission element which is coupled to both the drive lever and a positive locking element which is mounted on a drive axis of the step switch mechanism.

20. The assembly according to claim 19 wherein the transmission element is a toothed segment which is mounted on a rotary axis of the drive lever and engages a pinion which is mounted on the drive axis of the step switch mechanism.

21. The assembly according to claim 19 wherein the drive axis of the step switch mechanism and the rotary axis of the drive lever run parallel to each other.

22. A continuously variable manual drive assembly for seat adjusters comprising:
- a first rail device and a second rail device which are displaceable relative to each other in a longitudinal direction; and
- a drive having:
  - a manual step switch mechanism which can be driven through a drive lever;
  - a locking device, coupled to the step switch mechanism, which blocks torque transfer on an output side but enables torque transfer on a drive side;
  - at least one transmission step which is coupled on one of the drive side and the output side to the step switch mechanism; and
  - an output-side gear element;
- wherein the first rail device is connected to the output-side gear element which, in turn, is coupled to a longitudinally aligned part of the second rail device and wherein drive-side forces are transferred through at least one element of the locking device to a coupling device which is coupled to the output-side gear element for the purpose of transferring torque and wherein the coupling device has a one-piece spring element with positive locking elements on the output side and positive locking elements on the drive side.

23. The assembly according to claim 22 wherein the uncoupling operating element is coupled to a switch element integrated in the drive lever which when actuated triggers one of the coupling and the uncoupling between the drive and the gear element on the output side.

24. A continuously variable manual drive assembly for seat adjusters comprising:

a first rail device and a second rail device which are displaceable relative to each other in a longitudinal direction; and
a drive having:
  a manual step switch mechanism which can be driven through a drive lever;
  a locking device, coupled to the step switch mechanism, which blocks torque transfer on an output side but enables torque transfer on a drive side;
  at least one transmission step which is coupled on one of the drive side and the output side to the step switch mechanism; and
  an output-side gear element;
wherein the first rail device is connected to the output-side gear element which, in turn, is coupled to a longitudinally aligned part of the second rail device and wherein drive-side forces are transferred through at least one element of the locking device to a coupling device which is coupled to the output-side gear element for the purpose of transferring torque and wherein for switching the coupling device, there is an axially displaceable sleeve and an uncoupling operating element connected therewith such that when the uncoupling operating element is actuated, the sleeve is moved axially against spring pretension and thereby breaks off the coupling between the drive and the gear element on the output side.

25. The assembly according to claim 24 wherein the uncoupling operating element is a tip-up lever, mounted on the drive side so that when tilted against pretension, an axial setting movement is exerted on the sleeve which thereby breaks off the coupling between the drive and the gear element on the output side.

26. A continuously variable manual drive for seat adjusters in motor vehicles comprising:
  a step switch mechanism for an active seat adjustment which transfers a drive force to at least one output-side gear element wherein in a power flow between the step switch mechanism and the output-side gear element there is a locking device which blocks a torque transfer on an output side but enables a torque transfer on a drive side; and
  a coupling device which in a non-actuated state maintains the power flow between the step switch mechanism and the output-side gear element by means of spring pretension and in an actuated state breaks off the connection between the output-side gear element and the locking device so that a seat adjustment is possible wherein the coupling device is formed as a spring element acting axially with respect to the drive axis.

27. The drive according to claim 26 wherein the coupling device has positive locking elements for maintaining the power flow between the step switch mechanism and the output-side gear element.

28. The drive according to claim 26 wherein the coupling device has friction locking elements for maintaining the power flow between the step switch mechanism and the output-side gear element.

29. The drive according to claim 26 wherein the coupling device has a first coupling region which is a constituent part of a gear element on the output side, and a second coupling region which is a constituent part of an element of one of the step switch mechanism and a locking device which is coupled to the step switch mechanism.

30. The drive according to claim 29 wherein the first coupling region and the second coupling region engage each other through spring pretension when the coupling device is in the non-activated state and can be axially displaced and thereby disengaged from each other when the coupling device is in the activated state.

31. The drive according to claim 26 wherein the coupling device has an integral spring element with positive locking elements on the output side and with positive locking elements on the drive side.

32. The drive according to claim 31 wherein the positive locking element of the coupling device is in permanent connection with one of associated positive locking elements of a gear element on the output side and a part belonging to the step switch mechanism, and wherein another positive locking element of the coupling device can be brought into coupling connection with a corresponding locking element in a wing element.

33. The drive according to claim 31 wherein the spring element is a plate spring having a spring area which is divided into several individually resilient segments with cogged free ends, and having a non-circular base surface contour of the spring element which is assigned to a positive locking element of one of the gear element on the output side and the positive locking element on the drive side.

34. The drive according to claim 33 wherein teeth on adjoining segments are off-set by a fraction of a tooth division.

35. The drive according to claim 33 wherein the segments are even in number and one of greater than and equal to the four and wherein the teeth of oppositely positioned segments one not staggered.

36. The drive according to claim 26 wherein the coupling device is formed as a spring element acting radially with respect to the drive axis.

37. The drive according to claim 26 wherein for actuating the coupling device, an uncoupling operating element is provided which is connected to an axially displaceable sleeve which, when the uncoupling operating element is actuated, is moved axially against the spring pretension to thereby disconnect the connection between the step switch mechanism and the gear element on the output side.

38. The drive according to claim 37 wherein the axially displaceable sleeve, during actuation of the uncoupling operating element, is moved against a spring force of the spring element axially towards the spring element and its positive locking elements on the drive side thereby moving out of engagement with positive locking elements on the associated coupling element.

39. The drive according to claim 37 wherein the axially displaceable sleeve, during actuation of the uncoupling operating element, is moved against the spring force of an axially acting spring towards an output-side gear element so that the output-side gear element is then brought out of engagement with the associated gear element on the drive side.

40. Use of the drive according to claim 26 for a continuously variable manual drive with a first and a second rail device which is one of rectilinear and curved of a longitudinal seat adjuster, wherein the rail devices are displaceable relative to each other in the longitudinal direction, and wherein the first rail device is connected to an output-side gear element of the drive, and the gear element is, in turn, coupled to a longitudinally aligned toothed part of the second rail.

* * * * *